(12) United States Patent
Taguchi et al.

(10) Patent No.: US 6,656,582 B2
(45) Date of Patent: *Dec. 2, 2003

(54) RUBBER PRODUCT WITH METALLIC STRUCTURE AND METHOD OF PRODUCING THE SAME

(75) Inventors: Takehiko Taguchi, Nagoya (JP); Ako Yoshikawa, Kasugai (JP); Shinji Iio, Inazawa (JP)

(73) Assignee: Tokai Rubber Industries, Ltd., Komaki (JP)

(*) Notice: Subject to any disclaimer, the term of this patent is extended or adjusted under 35 U.S.C. 154(b) by 211 days.

This patent is subject to a terminal disclaimer.

(21) Appl. No.: 09/871,340

(22) Filed: May 31, 2001

(65) Prior Publication Data

US 2002/0012788 A1 Jan. 31, 2002

(30) Foreign Application Priority Data

Jun. 16, 2000 (JP) .................................. 2000-181264
Jun. 26, 2000 (JP) .................................. 2000-191132

(51) Int. Cl.[7] .................. B32B 15/06; B32B 15/08; B32B 5/16
(52) U.S. Cl. ................. 428/327; 428/463; 428/465
(58) Field of Search ............... 428/461, 463, 428/465, 327; 528/480

(56) References Cited

U.S. PATENT DOCUMENTS

| | | | | |
|---|---|---|---|---|
| 3,833,689 A | | 9/1974 | Usamoto et al. ............ 250/897 |
| 3,937,683 A | * | 2/1976 | Ferrar ........................ 524/444 |
| 4,419,496 A | * | 12/1983 | Henton et al. ............... 525/301 |
| 5,140,371 A | * | 8/1992 | Ishihara et al. ............. 399/176 |
| 5,209,872 A | * | 5/1993 | Takahashi et al. ........... 252/511 |
| 5,213,739 A | * | 5/1993 | Dickerson et al. .......... 264/135 |
| 5,279,900 A | | 1/1994 | Takeuchi et al. ............ 428/462 |
| 5,397,833 A | * | 3/1995 | Arjunan ..................... 524/522 |
| 6,043,308 A | * | 3/2000 | Tanahashi et al. .......... 524/495 |
| 6,268,427 B1 | * | 7/2001 | Wang et al. ................ 524/504 |
| 6,456,607 B2 | * | 9/2002 | Arai et al. .................. 370/335 |
| 6,458,883 B1 | * | 10/2002 | Takashima et al. ......... 524/495 |
| 6,503,974 B1 | * | 1/2003 | Ogasawara et al. ......... 524/495 |

FOREIGN PATENT DOCUMENTS

| | | | |
|---|---|---|---|
| GB | 1317814 | | 5/1973 |
| JP | 01287154 | * | 11/1989 |
| JP | 03208527 | * | 7/1991 |
| JP | 04247367 | * | 8/1992 |
| JP | 11152950 | * | 5/1999 |
| WO | 00/34383 | | 6/2000 |
| WO | 01/32769 | A1 | 5/2001 |

* cited by examiner

*Primary Examiner*—Paul Thibodeau
*Assistant Examiner*—Kevin R Kruer
(74) *Attorney, Agent, or Firm*—Burr & Brown (57) ABSTRACT

A rubber product with a metallic structure formed from an aluminum material having a vulcanized rubber bonded thereto. The vulcanized rubber is formed from a composition in which a natural rubber and an acrylic rubber are mixed in a proportion of 90/10–60/40 by weight. The vulcanized rubber has an island-sea structure in which fine particles of said acrylic rubber having a size of 0.1–100 μm are dispersed in a matrix phase of the natural rubber. A method of producing the rubber product with the metallic structure is also disclosed.

5 Claims, 2 Drawing Sheets

RUBBER PRODUCT WITH METALLIC STRUCTURE AND METHOD OF PRODUCING THE SAME

This application is based on Japanese Patent Application No. 2000-191132 filed Jun. 26, 2000, the contents of which are incorporated hereinto by reference.

BACKGROUND OF THE INVENTION

1. Field of the Invention

The present invention relates to a rubber product with a metallic structure and a method of producing the same. More particularly, the present invention is concerned with a rubber product with a metallic structure formed of an aluminum material, wherein a vulcanized rubber is bonded to the metallic structure, and a method suitable for producing such a rubber product.

2. Discussion of Related Art

A rubber product with a metallic structure has been widely used in various fields. In the rubber product, a vulcanized rubber having excellent properties in view of flexibility, resiliency, viscoelasticity, cushioning capability, etc., is bonded to the metallic structure. For instance, such a rubber product with the metallic structure is used in vehicles such as automotive vehicles, and in mechanical equipments, as a vibration damping rubber member interposed between two members in a vibration or shock transmitting system so as to exhibit vibration damping or cushioning characteristics.

The vibration damping rubber member as the rubber product with the metallic structure used on the automotive vehicles, in particular, is required to have a reduced weight in order to improve fuel economy and to achieve high performance of the automotive vehicles. To this end, the metallic structure is formed of an aluminum material in place of a conventionally used ferrous material.

By using the aluminum material, in place of the ferrous material, for the metallic structure of the rubber product, the rubber product tends to suffer from a local cell formed due to galvanic corrosion (contact corrosion). Described more specifically, where the vulcanized rubber of the rubber product is formed from a rubber composition in which a large amount of reinforcing filler such as a carbon black is included for maintaining the hardness of the vulcanized rubber at a level suitable for use as the vibration damping rubber, the vulcanized rubber has a relatively low degree of volume resistivity, and accordingly has a relatively high degree of electric conductivity. In this rubber product, the metallic structure of the aluminum material (hereinafter referred to simply as "metallic structure") is likely to be corroded by contact with the vulcanized rubber having high conductivity, due to a large difference of an electric potential between the highly conductive vulcanized rubber and the metallic structure.

To prevent corrosion of the metallic structure of aluminum, the metallic structure is subjected to a chemical conversion coating treatment such as a chromate treatment or a phosphate treatment, for improving corrosion resistance of the metallic structure. Such a chemical conversion coating treatment, however, is not sufficient for preventing the corrosion of the metallic structure, and it is required to provide more effective technique to improve the corrosion resistance of the metallic structure.

As an alternative technique to prevent the corrosion of the metallic structure of aluminum by contact with the vulcanized rubber, the amount of the carbon black which is included in the rubber composition for forming the vulcanized rubber and which increases the conductivity of the vulcanized rubber is reduced so as to increase the volume resistivity of the vulcanized rubber. The reduction of the carbon black content, however, gives rise to another problems such as deterioration of the physical properties such as the hardness and strength of the vulcanized rubber, and deterioration of moldability of the rubber composition for the vulcanized rubber. In view of this, it is difficult or undesirable to reduce the amount of the carbon black for decreasing the volume resistivity of the vulcanized rubber.

SUMMARY OF THE INVENTION

The present invention was made in view of the background art described above. It is a first object of this invention to provide a rubber product with a metallic structure which has a reduced weight and which exhibits a high degree of corrosion resistance by minimizing the amount of the carbon black included in the rubber composition for forming the vulcanized rubber which is bonded to the metallic structure, so as to increase the volume resistivity of the vulcanized rubber, while assuring required physical properties such as the hardness and strength of the vulcanized rubber.

It is a second object of the present invention to provide a method suitable for producing such a rubber product with a metallic structure.

The first object indicated above may be achieved according to a first aspect of the present invention, which provides a rubber product with a metallic structure formed of an aluminum material, wherein a vulcanized rubber is bonded to the metallic structure, wherein an improvement comprises: the vulcanized rubber being formed from a composition in which a natural rubber and an acrylic rubber are mixed in a proportion of 90/10–60/40 by weight; and the vulcanized rubber having an island-sea structure in which fine particles of the acrylic rubber having a size of 0.1–100 µm are dispersed in a matrix phase of the natural rubber.

In the rubber product with the metallic structure constructed according to the above-indicated first aspect of the present invention, the metallic structure is formed of an aluminum material, and the vulcanized rubber bonded to the metallic structure has an island-sea structure wherein a predetermined amount of the acrylic rubber is dispersed in the form of fine particles in the matrix phase of the natural rubber. The present rubber product is primarily characterized by this island-sea structure which is formed as described above. The thus formed rubber product has a reduced weight owing to the metallic structure of aluminum, and the vulcanized rubber bonded to the metallic structure has increased hardness owing to the presence of the fine particles of acrylic rubber distributed in the vulcanized rubber structure. Accordingly, the amount of the carbon black included in the rubber composition for forming the vulcanized rubber can be advantageously reduced so as to increase the volume resistivity of the vulcanized rubber, for thereby effectively preventing the metallic structure from being corroded by contact with the vulcanized rubber.

In the rubber composition for forming the vulcanized rubber of the present invention, the natural rubber and the acrylic rubber are mixed in a proportion of 90/10–60/40 by weight. In the vulcanized rubber obtained by vulcanization of the thus prepared rubber composition, the vulcanized acrylic rubber is dispersed in the form of fine particles having a size of 0.1–100 µm in the matrix phase of the vulcanized natural rubber. According to this structure, the vulcanized rubber bonded to the metallic structure has desirable physical properties such as high hardness and strength, and the rubber product with the metallic structure exhibits a high corrosion resistance.

In a preferred form of the above-described first aspect of this invention, the vulcanized rubber has a volume resistivity of not lower than $1 \times 10^6$ Ωcm, for further improved corrosion resistance of the metallic structure.

The present invention also provides a vibration damping rubber member for use on automotive vehicles, which vibration damping rubber member is constituted by the rubber product with the metallic structure constructed as described above. The vibration damping rubber member constituted by the rubber product according to the present invention has a high corrosion resistance and a reduced weight, and exhibits the physical properties required by the vibration damping rubber.

The second object indicated above may be achieved according to a second aspect of the present invention, which provides a method of producing a rubber product with a metallic structure formed of an aluminum material, wherein a vulcanized rubber is bonded to the metallic structure, the method comprising the steps of evenly mixing an unvulcanized natural rubber material, and an unvulcanized acrylic rubber material in a proportion of 90/10–60/40 by weight, together with a vulcanizing agent capable of vulcanizing only the unvulcanized acrylic rubber material, so that the unvulcanized acrylic rubber material is finely dispersed in the unvulcanized natural rubber material; vulcanizing the unvulcanized acrylic rubber material finely dispersed in the unvulcanized natural rubber material; and vulcanizing the unvulcanized natural rubber material after a vulcanizing agent capable of vulcanizing the unvulcanized natural rubber material has been added, for obtaining the vulcanized rubber which is bonded to the metallic structure, the vulcanized rubber having an island-sea structure wherein fine particles of a vulcanized acrylic rubber having a size of 0.1–100 μm and obtained by vulcanization of the unvulcanized acrylic rubber material are dispersed in a matrix phase of a vulcanized natural rubber obtained by vulcanization of the unvulcanized natural rubber material.

The second object indicated above may also be achieved according to a third aspect of the present invention, which provides a method of producing a rubber product with a metallic structure formed of an aluminum material, wherein a vulcanized rubber is bonded to the metallic structure, the method comprising the steps of: preparing an unvulcanized rubber composition by evenly mixing together an unvulcanized natural rubber material and an unvulcanized acrylic rubber material in a proportion of 90/10–60/40 by weight, and adding a vulcanizing agent for vulcanizing the unvulcanized natural rubber material and a vulcanizing agent for vulcanizing the unvulcanized acrylic rubber material; and vulcanizing a thus obtained mixture for obtaining the vulcanized rubber which is bonded to the metallic structure, the vulcanized rubber having an island-sea structure wherein fine particles of a vulcanized acrylic rubber having a size of 0.1–100 μm and obtained by vulcanization of the unvulcanized acrylic rubber material are dispersed in a matrix phase of a vulcanized natural rubber obtained by vulcanization of the unvulcanized natural rubber material.

According to these methods described above, the vulcanized rubber having the island-sea structure in which the fine particles of the vulcanized acrylic rubber are evenly dispersed in the matrix phase of the vulcanized natural rubber can be bonded to the metallic structure formed of the aluminum material. Therefore, these methods described above permit the produced rubber product with the metallic structure to have an improved corrosion resistance and a reduced weight.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE INVENTION

In the rubber product with the metallic structure of the present invention, the metallic structure is formed of an aluminum material such as aluminum or an aluminum alloy, so that the rubber product of the present invention has a considerably smaller weight than the conventional rubber product whose metallic structure is formed of a ferrous material. The metallic structure of aluminum of the present invention may be preferably subjected to a chemical conversion coating treatment or an anodic oxide coating treatment known in the art, for improving its corrosion resistance.

The vulcanized rubber bonded to the metallic structure is formed of a mixture of a natural rubber and an acrylic rubber. Described in detail, the vulcanized rubber of the present rubber product has an island-sea structure in which the vulcanized acrylic rubber is dispersed in the form of fine particles having a size of 0.1–100 μm in a matrix phase of the vulcanized natural rubber. According to this structure, the metallic structure is effectively prevented from being corroded.

The unvulcanized natural rubber and the unvulcanized acrylic rubber used as a rubber composition for forming the vulcanized rubber of the present rubber product are both polymers which are mutually incompatible. In the vulcanized rubber obtained by vulcanization of the two unvulcanized rubber materials which are mixed together in a predetermined proportion, the vulcanized natural rubber and the vulcanized acrylic rubber are not mutually compatible. In the vulcanized rubber of the present rubber product, the vulcanized acrylic rubber is dispersed, in the matrix phase of the vulcanized natural rubber, in the form of fine particles having a size of 0.1–100 μm, preferably a size of not larger than 10 μm. Owing to the fine particles of the vulcanized acrylic rubber dispersed in the matrix phase of the vulcanized natural rubber, the hardness of the vulcanized rubber (the rubber product) is advantageously improved. Accordingly, the amount of the carbon black included in the rubber composition for the purpose of increasing the hardness of the vulcanized rubber to be formed can be reduced in the present invention. In other words, the fine particles of non-conductive acrylic rubber, instead of the carbon black, give required hardness to the vulcanized rubber, so that the amount of the carbon black included in the rubber composition can be effectively reduced. According to this arrangement, the volume resistivity of the vulcanized rubber can be increased while lowering its electric conductivity, for thereby effectively improving the corrosion resistance of the metallic structure of the rubber product. The size of the fine particles of the acrylic rubber exceeding the upper limit of 100 μm adversely influences the physical properties such as breaking elongation of the rubber product. The particle size of the acrylic rubber may be measured by various known methods. For instance, the particles of the acrylic rubber are observed by a scanning electron microscope (SEM) or a scanning probe microscope (SPM), to measure the sizes of the particles.

For permitting the rubber product with the metallic structure formed as the end product to exhibit the desired operating characteristics or physical properties, the ratio of the weight of the unvulcanized natural rubber material to that of the unvulcanized acrylic rubber material is selected within a range between 90/10 and 60/40. If the amount of the unvulcanized acrylic rubber material is excessively smaller than that of the unvulcanized natural rubber material, the produced rubber product does not enjoy the effect to be obtained by addition of the unvulcanized acrylic rubber material. If the amount of the unvulcanized acrylic rubber material is excessively larger than that of the unvulcanized natural rubber material, on the other hand, the physical properties such as the tensile strength of the rubber product may be deteriorated, although the hardness is increased. Where the amount of the unvulcanized acrylic rubber material is extremely larger than that of the unvulcanized natural rubber material, the vulcanized acrylic rubber, rather than the vulcanized natural rubber, may undesirably be a matrix phase in the produced rubber product. In this case, the rubber product may not have the desired structure described above and the desired properties required by the rubber product with the metallic structure.

The natural rubber material and the acrylic rubber material used for producing the present rubber product are suitably selected from among those known in the art. For instance, the acrylic rubber material may be selected as needed, depending upon the desired characteristics required by the rubber product, from among any known synthetic rubber materials whose major component is alkyl acrylate. In particular, it is preferable to use acrylic rubber materials which can be vulcanized with a polyamine-based vulcanizing agent which will be described. For instance, it is preferable to use a copolymer (ACM) of alkyl acrylate and 2-chloroethyl vinyl ether, a copolymer (ANM) of alkyl acrylate and acrylonitrile, and a copolymer (AEM) of alkyl acrylate and ethylene.

According to the present invention, the unvulcanized natural rubber material and the unvulcanized acrylic rubber material are subjected to a molding and vulcanizing operation in the presence of the metallic structure of aluminum, whereby the vulcanized rubber is bonded to the metallic structure, so as to provide the desired rubber product with the metallic structure. In producing the present rubber product, suitable amounts of known vulcanizing agents suitable for vulcanizing the unvulcanized natural rubber material and the unvulcanized acrylic rubber material, respectively, are added to the rubber composition prior to its vulcanization. As the vulcanizing agent for vulcanizing the unvulcanized natural rubber material, a sulfur-based vulcanizing agent such as sulfur is generally used, so that the unvulcanized natural rubber material is vulcanized by a known sulfur-based vulcanizing system. The vulcanizing agent for vulcanizing the unvulcanized acrylic rubber material is suitably selected from among any known vulcanizing agents depending upon the kinds of the acrylic rubber material to be used. For instance, the polyamine-based vulcanizing agent such as hexamethylene diamine carbamate or triethylene tetramine is used. Where the vulcanization of the unvulcanized acrylic rubber material precedes the vulcanization of the unvulcanized natural rubber material, the above-described polyamine-based vulcanizing agent needs to be capable of vulcanizing only the acrylic rubber material, without vulcanizing the natural rubber material.

In the present invention, at least one selected vulcanization promoting agent and/or aid may be used in combination with the respective vulcanizing agents for vulcanizing the respective two unvulcanized rubber materials. The appropriate vulcanization promoting agent(s) and/or aid(s) is/are selected depending upon the specific unvulcanized rubber material (the unvulcanized natural rubber material or the unvulcanized acrylic rubber material) and the specific vulcanizing agent. The selected at least one vulcanization promoting agent and/or aid is mixed and kneaded in a suitable amount with the specific unvulcanized rubber material and the specific vulcanizing agent, so that the unvulcanized rubber material is vulcanized with an improved result.

Typical examples of the vulcanization promoting agent include: sulfenamides such as N-tert-butyl-2-benzothiazolylsulfenamide (BBS), N-cyclohexyl-2-benzothiazolylsulfenamide (CBS), and N-oxydiethylene-2-benzothiazolylsulfenamide (OBS); dithiocarbamates such as zinc dimethyldithiocarbamate (ZnMDC) and zinc diethyldithiocarbamate (ZnEDC); and thiurams such as tetramethyl thiuram disulfide (TMTD), tetraethyl thiuram disulfide (TETD), and tetrabutyl thiuram disulfide (TBTD). As the vulcanization promoting aid, zinc oxide or stearic acid is used, for instance.

Various other suitable known additives may be added to the unvulcanized rubber materials, as needed. Those additives may include: reinforcing agents such as carbon black; anti-aging agents such as wax; and softening agents such as oil. It is noted that these additives should not prevent the produced rubber product with the metallic structure from exhibiting the desired physical properties and operating characteristics and the amounts of the additives should be determined so as not to deteriorate those physical properties and operating characteristics of the rubber product.

Where the carbon black is added to the unvulcanized rubber composition, it is desirable to minimize the amount of the carbon black to be added since the volume resistivity of the produced rubber product is lowered and the electric conductivity of the rubber product increases with an increase of the amount of the carbon black. In view of this, the amount of the carbon black to be added to the unvulcanized rubber composition is preferably determined such that the volume resistivity of the vulcanized rubber of the rubber product is not lower than $1 \times 10^6$ Ωcm, preferably not lower than $1 \times 10^8$ Ωcm. If the volume resistivity of the vulcanized rubber of the rubber product is lower than $1 \times 10^6$ Ωcm, the corrosion of the metallic structure by contact with the vulcanized rubber may not be effectively prevented.

In producing the present rubber product with the metallic structure, various methods known in the art can be employed. As one example of the methods, the unvulcanized natural rubber material and the unvulcanized acrylic rubber material are mixed in a suitable ratio by weight, i.e., the ratio of the weight of the natural rubber material to that of the acrylic rubber material=90/10–60/40, together with a vulcanizing agent which does not vulcanize the natural rubber but promotes the vulcanization of the acrylic rubber. After the mixture has been introduced into a suitable known kneader or mixer such as a banbury mixer which permits kneading or mixing of polymer materials under an ordinary heating condition, the mixture is uniformly kneaded under heat, so that the acrylic rubber can be vulcanized without the vulcanization of the natural rubber, while the fine particles of the unvulcanized acrylic rubber material having a predetermined suitable size are evenly dispersed in the unvulcanized natural rubber material.

After the vulcanization of the unvulcanized acrylic rubber material as described above, a vulcanizing agent capable of vulcanizing the unvulcanized natural rubber material within which the vulcanized acrylic rubber is dispersed in the form of fine particles, and suitable additives are added to the natural rubber material. The thus obtained mixture is uniformly mixed and kneaded in a mixer of roll type. Subsequently, the mixture is formed into a desired shape by a suitable molding method using a mold assembly in which the metallic structure of aluminum is positioned in place, at a suitably determined temperature at which the unvulcanized natural rubber material is vulcanized. In place of this method wherein the metallic structure and the vulcanized rubber are bonded together during the molding and vulcanizing operation, the metallic structure may be bonded to a formed vulcanized rubber member which has been obtained after the vulcanization of the mixture described above.

In vulcanizing the acrylic rubber material according to this method, at least one selected vulcanization promoting agent and/or aid may be used in combination with the vulcanizing agent for vulcanizing the acrylic rubber material, depending upon the kinds of the acrylic rubber material and the vulcanizing agent. In addition, various other known additives may be added, provided that those additives do not vulcanize the natural rubber material.

The order of introducing, into the kneader, the unvulcanized natural rubber material, unvulcanized acrylic rubber material, and vulcanizing agent for vulcanizing the acrylic rubber is not limited to that described above. These components may be simultaneously introduced into the kneader or mixer without any problem. However, it is desirable to prepare a mixture of the unvulcanized acrylic rubber material and the vulcanizing agent capable of vulcanizing only the acrylic rubber, with a suitable proportion, in the form of a master batch, for example. In this case, the prepared mixture and the unvulcanized natural rubber material are introduced into the kneader, so as to establish the desired ratio by weight of the unvulcanized natural rubber material and the unvulcanized acrylic rubber material. This method is effective to shorten the time required for kneading or mixing the materials within the kneader, and permit improved uniformity or evenness of dispersion of the acrylic rubber material and the vulcanizing agent in the natural rubber material.

The materials which have been introduced into the kneader as described above are subsequently kneaded. In order to establish the desired state of dispersion of the fine particles of the acrylic rubber, the kneading time is determined in view of the specific kinds and the amounts of the natural rubber material and the acrylic rubber material, and the operating characteristics of the kneader. The materials are kneaded at a temperature that facilitates the kneading operation and permits a high degree of vulcanizing reaction of the acrylic rubber material. In the kneading operation of the unvulcanized natural rubber material within which the vulcanized acrylic rubber is dispersed in the form of fine particles, which kneading operation is followed by the addition of the vulcanizing agent for vulcanizing the natural rubber material, the kneading length of time and the temperature condition in which the kneading is effected are suitably determined.

In molding and vulcanizing the unvulcanized natural rubber material, the vulcanizing condition such as the temperature, pressure and time is suitably determined depending upon the specific kinds of the unvulcanized natural rubber material and the vulcanizing agent for vulcanizing the natural rubber, for effectively vulcanizing the natural rubber, so that the vulcanized rubber is bonded to the metallic structure. The molding and vulcanization operation may be effected according to any known manner such as a press-molding and -vulcanizing process in which the molding and the vulcanization are effected concurrently. The size and configuration of the rubber member with the metallic structure are not particularly limited, but may be suitably determined depending upon the desired application of the rubber product.

As another example of the method of producing the rubber product with the metallic structure according to the present invention, the unvulcanized natural rubber material and the unvulcanized acrylic rubber material are mixed in a suitable ratio by weight, i.e., the ratio of the weight of the natural rubber material to that of the acrylic rubber material= 90/10–60/40, and the mixture is introduced into a suitable known kneader or mixer such as a banbury mixer or a mixer of roll type, so that the mixture is evenly kneaded. To this mixture, the vulcanizing agents for vulcanizing the respective unvulcanized rubber materials and the suitably selected additives are added and kneaded, so as to provide an unvulcanized rubber composition in which the unvulcanized acrylic rubber material is evenly dispersed in the form of fine particles having a predetermined size in the unvulcanized natural rubber material. Subsequently, the thus obtained unvulcanized rubber composition is formed into a desired shape by a suitable molding method using a mold assembly, at a suitably determined temperature at which the unvulcanized natural rubber material and the unvulcanized acrylic rubber material are concurrently vulcanized. During or after the molding and vulcanizing operation, the metallic structure is bonded to the vulcanized rubber in a known manner, so as to provide the intended rubber product with the metallic structure according to the present invention.

In the method described above, the order of introducing, into the kneader, the unvulcanized natural rubber material, unvulcanized acrylic rubber material, vulcanizing agents for vulcanizing the respective unvulcanized rubber materials, and additives is not limited to that described above. For instance, these components may be simultaneously introduced into the kneader or mixer. Alternatively, all components except the vulcanizing agents are introduced into the kneader or mixer for preliminary kneading, and the vulcanizing agents may be added in a subsequent step of finish kneading. In the present method, the components are mixed together such that the unvulcanized natural rubber material and the unvulcanized acrylic rubber material are vulcanized concurrently, or successively after the vulcanizing agents have been added.

The kneading operation is effected at a suitable temperature for a suitable time period. In the present method, in order to establish the desired state of dispersion of the fine particles of the acrylic rubber, the kneading time is determined in view of the specific kinds and the amounts of the natural rubber material and the acrylic rubber material, and the operating characteristic of the kneader.

In molding and vulcanizing the unvulcanized rubber composition, the vulcanizing condition such as the temperature, pressure and time is suitably determined depending upon the specific kinds of the unvulcanized natural rubber material, the unvulcanized acrylic rubber material, and the vulcanizing agents, for achieving effective vulcanization of those unvulcanized rubber materials. The molding and vulcanizing operation may be effected according to any known manner such as a press-molding and -vulcanizing process in which the molding and the vulcanization are effected concurrently. It is to be understood that the configuration and size of the rubber product with the metallic structure are not particularly limited, but may be suitably determined depending upon the desired application of the rubber product.

There have been described two examples of the method of producing the rubber product with the metallic structure according to the present invention. It is to be understood, however, that the method of producing the present rubber product with the metallic structure is not limited to those described above. In essence, the method of producing the present rubber product with the metallic structure permits the vulcanized rubber of the rubber product to be constituted by an intimate mixture of the vulcanized natural rubber and the vulcanized acrylic rubber and to have the island-sea structure in which the vulcanized acrylic rubber is dispersed, in the matrix phase of the vulcanized natural rubber, in the form of fine particles having a size of 0.1–100 µm.

The rubber product with the metallic structure formed as described above exhibits a high corrosion resistance and has a reduced weight, so that the present rubber product can be advantageously used as a vibration damping rubber member which is interposed between two members in a vibration or shock transmitting system and which is used on automotive vehicles, as engine mounts, body mounts, cab mounts, member mounts, strut mounts, strut bar cushions, suspension bushings, and so on.

Figure 1:
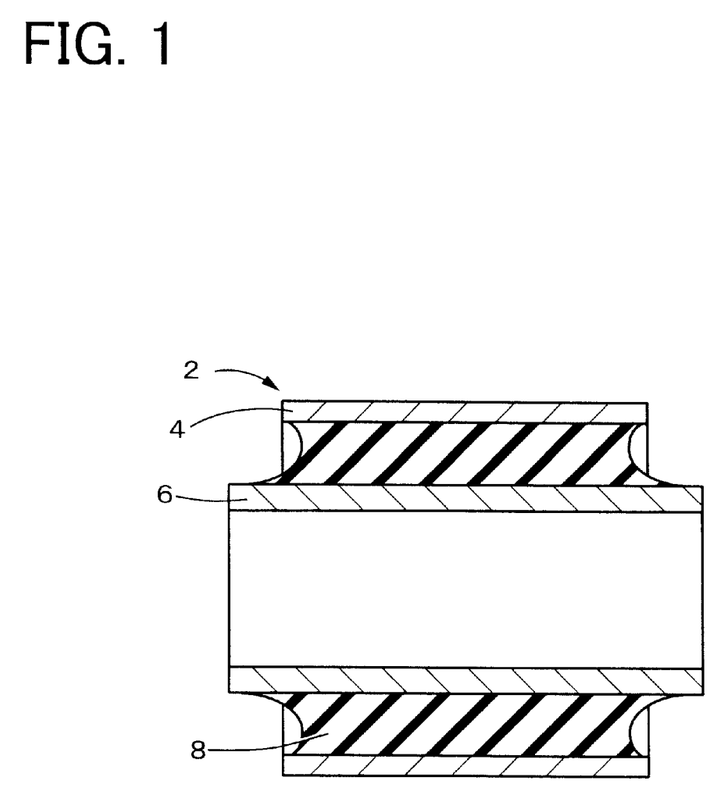
FIG. 1 is an axial cross sectional view of one embodiment of a rubber product with a metallic structure of the present invention in the form of a control arm bush for an automotive vehicle.

Referring to FIG. 1, there is shown a rubber product with the metallic structure constructed according to one embodiment of the present invention, in the form of a control arm bushing as a vibration damping rubber member to be installed on automotive vehicles. The control arm bushing 2 includes a metallic structure consisting of an outer sleeve member 4 and an inner sleeve member 6, and a vulcanized rubber 8 bonded to the metallic structure. The control arm bushing 2 is formed by bonding the vulcanized rubber 8 to the outer and inner sleeve members 4, 6 after a suitable vulcanizing adhesive agent known in the art has been applied to the inner circumferential surface of the outer sleeve member 4 and the outer circumferential surface of the inner sleeve member 2, which circumferential surfaces are to be held in close contact with the vulcanized rubber 8. In bonding operation, various known techniques may be employed. For instance, the vulcanized rubber 8, which has been formed from the unvulcanized rubber composition that is capable of giving the predetermined structure according to the present invention, is bonded to the outer and inner sleeve members 4, 6 at their inner and outer circumferential surfaces to which the suitably selected vulcanizing adhesive agent has been applied. Alternatively, the outer and inner sleeve members 4, 6 are positioned relative to each other within a cavity of a mold assembly. After the vulcanizing adhesive agent has been applied to the inner and outer circumferential surfaces of the outer and inner sleeve members 4, 6, respectively, the unvulcanized rubber composition is introduced into the cavity of the mold assembly, and is heated for vulcanization, so that the vulcanized rubber 8 is bonded to the outer and inner sleeve members 4, 6 during the vulcanization of the unvulcanized rubber composition. The automotive vehicles on which the vibration damping rubber member such as the control arm bushing 2 (the rubber product with the metallic structure) is installed have an advantageously reduced weight.

EXAMPLES

To further clarify the present invention, some examples of the present invention will be described. It is to be understood that the present invention is not limited to the details of these examples, but may be embodied with various changes, modifications and improvements, other than the following examples and the details of the foregoing descriptions, which may occur to those skilled in the art, without departing from the spirit of the invention defined in the attached claims.

As the unvulcanized rubber materials, an unvulcanized natural rubber (NR) material and an unvulcanized acrylic rubber (AEM) material (AEM: "VAMAC-G" available from Mitsui Dupont Polychemical Kabushiki Kaisha, Japan) were prepared. Further, there was prepared a master batch (hereinafter referred to as "master batch AEM") of a composition indicated in TABLE 1 below, which includes a mixture of the unvulcanized acrylic rubber (VAMAC-G) and hexamethylenediamine carbamate as a vulcanizing agent B. The master batch AEM further includes diorthotolyl guanidine (DT) as the vulcanization promoting agent, and stearic acid as the vulcanization promoting aid.

TABLE 1

| Composition | Contents (by weight) |
|---|---|
| AEM | 100 |
| Vulcanizing agent B | 2 |
| Vulcanization promoting agent | 5 |
| Vulcanization promoting aid | 2 |

Preparation of Samples 1–5 and Comparative Samples 5 and 6

Precursors of Samples 1–5 according to the present invention and precursors of Comparative Samples 5 and 6 were prepared from respective combinations of the NR material and the master batch AEM prepared as described above, which combinations have respective proportions of mixing or blending (by weight) of the NR material and the master batch AEM (blending ratios of NR/AEM) as indicated in TABLE 2 and TABLE 3 below. The individual combinations were introduced into a kneader called "banbury mixer", and were evenly kneaded or mixed together for 5 minutes at a temperature of 150–160° C., so that only acrylic rubber material was vulcanized, without vulcanization of the NR material.

To the precursors of Samples 1–5 of the present invention and the precursors of Comparative Samples 5 and 6, there were added sulfur as a vulcanizing agent A for vulcanizing the NR, and various additives indicated in TABLES 2 and 3, in respective amounts indicated in TABLES 2 and 3. The additives consist of zinc oxide plus stearic acid as a vulcanization promoting aid, HAF carbon black (ASTM-N330), and an aromatic process oil as a softening agent. All components indicated above were evenly kneaded with a mixer of roll type, and the obtained mixtures were subjected to a press-molding and -vulcanizing process, to prepare vulcanized rubbers as test pieces of Samples 1–5 according to the present invention and Comparative Samples 5 and 6, for performing a tensile test, a hardness test, and a volume resistivity test. The vulcanization was effected for 20 minutes at a temperature of 160° C. For each of the test pieces according to Samples 1–5 of the invention, the sizes of particles of the acrylic rubber dispersed within the mass of the NR were measured to obtain the average particle size of the acrylic rubber. The obtained average particle size of the acrylic rubber in each test piece was confirmed to be about 0.5–2 μm.

Preparation of Sample 6

A test piece of Sample 6 according to the present invention was prepared in the following manner. Initially, the NR material and the acrylic rubber material were mixed together in a proportion of mixing or blending (by weight) of the NR material and the acrylic rubber material as indicated in TABLE 2, and the mixture of the NR and the acrylic rubber was evenly kneaded in a banbury mixer. To 100 parts by weight of the thus prepared rubber mixture, there were added zinc oxide plus stearic acid as a vulcanization promoting aid, HAF carbon black (ASTM-N330), and an aromatic process oil as a softening agent, in respective amounts indicated in TABLE 2. After the mixture has been kneaded in the banbury mixer, there were added sulfur as a vulcanizing agent A, hexamethylenediamine carbamate as a vulcanizing agent B, and N-cyclohexyl-2-benzothiazolylsulfeneamide as a vulcanization promoting agent, in respective amounts also indicated in TABLE 2. All components were evenly kneaded with a mixer of roll type, so as to provide an unvulcanized rubber composition. The thus obtained unvulcanized rubber composition was subjected to a press-molding and -vulcanizing process for 20 minutes at 160° C., so that the NR material and the acrylic rubber material were concurrently vulcanized, for thereby providing the vulcanized rubber as the test piece of Sample 6, for performing a tensile test, a hardness test, and a volume resistivity test. For this Sample 6, the size of the particles of the acrylic rubber dispersed within the mass of the NR was measured to obtain the average particle size of the acrylic rubber. The obtained average particle size of the acrylic rubber in this Sample 6 was confirmed to be about 0.5–3 μm.

Preparation of Comparative Samples 1–4

On the other hand, test pieces according to Comparative Samples 1–4 were prepared for the tensile test, hardness test, and volume resistivity test, by molding and vulcanizing respective rubber compositions indicated in TABLE 3, for 20 minutes at 160° C., by a press-molding and -vulcanizing process. These rubber compositions include only the NR material as the rubber material.

TABLE 2

| Components (parts by weight) | Samples of the Invention | | | | | |
|---|---|---|---|---|---|---|
| | 1 | 2 | 3 | 4 | 5 | 6 |
| NR | 70 | 70 | 70 | 90 | 60 | 70 |
| Master batch AEM | 32.7 | 32.7 | 32.7 | 10.9 | 43.6 | — |
| AEM | — | — | — | — | — | 30 |
| Carbon black | 25 | 45 | 55 | 55 | 55 | 55 |
| Softening agent | 5 | 5 | 5 | 5 | 5 | 5 |
| Vulcanizing agent A | 1 | 1 | 1 | 1 | 1 | 1 |
| Vulcanizing agent B | — | — | — | — | — | 0.6 |
| Vulcanization promoting agent | 2 | 2 | 2 | 2 | 2 | 2 |
| Vulcanization promoting aid | 5 | 5 | 5 | 5 | 5 | 5 |

TABLE 3

| Components (parts by weight) | Comparative Samples | | | | | |
|---|---|---|---|---|---|---|
| | 1 | 2 | 3 | 4 | 5 | 6 |
| NR | 100 | 100 | 100 | 100 | 95 | 50 |
| Master batch AEM | — | — | — | — | 5.45 | 54.5 |
| AEM | — | — | — | — | — | — |
| Carbon black | 25 | 35 | 45 | 55 | 55 | 55 |
| Softening agent | 5 | 5 | 5 | 5 | 5 | 5 |
| Vulcanizing agent A | 1 | 1 | 1 | 1 | 1 | 1 |
| Vulcanizing agent B | — | — | — | — | — | — |
| Vulcanization promoting agent | 2 | 2 | 2 | 2 | 2 | 2 |
| Vulcanization promoting aid | 5 | 5 | 5 | 5 | 5 | 5 |

The test pieces to be used for the tensile test are dumbbell-shaped test pieces (No. 5 type) formed of the vulcanized rubber according to JIS-K-6251-1993, "Tensile Test Method of Vulcanized Rubber". The test pieces to be used for the hardness test are plates formed of the vulcanized rubber having a thickness of 2 mm according to JIS-K-6253-1997, "durometer hardness test" described in "Physical Test Method of Vulcanized Rubber". The test pieces to be used for the volume resistivity test are sheets formed of the vulcanized rubber having a size of 150 mm×150 mm×2 mm according to SRIS-2304-1971.

The test pieces according to Samples 1–6 of the present invention and the test pieces according to Comparative Samples 1–6, which were prepared as described above, were subjected to the tensile test, hardness test, and volume resistivity test in the following manners.

Tensile Test

The test pieces for the tensile test were subjected to a tensile load with a tensile tester, according to JIS-K-6251-1993, "Tensile Test Method of Vulcanized Rubber" described above, until each test piece was broken or fractured. In this process of application of the tensile load to the test piece, there were measured a maximum tensile stress (tensile strength Tb) when the test piece was broken, and an amount of elongation (breaking elongation Eb) when the test piece was broken. The measurements are indicated in TABLE 4 and TABLE 5.

Hardness Test

The hardness of each test piece for the hardness test was measured by a type-A durometer, according to JIS-K-6253-1997, "durometer hardness test" described above. The measurements are indicated in TABLE 4 and TABLE 5.

Volume Resistivity Test

The volume resistivity (ρv) for each test piece for the volume resistivity test was measured according to SRIS-2304-1971, "Volume Resistivity Test Method of Rubber and Equivalent" specified by Japan Rubber Association. The measurements are indicated in TABLE 4 and TABLE 5. The test was performed by using three electrodes consisting of a main electrode having a diameter of 50 mm, a guard electrode having a width of 5 mm and an inside diameter of 60 mm, and a counter electrode having a diameter of at least 100 mm. The measurements were performed by applying, to each test piece, a voltage of 500 V for one minute.

Figure 2:
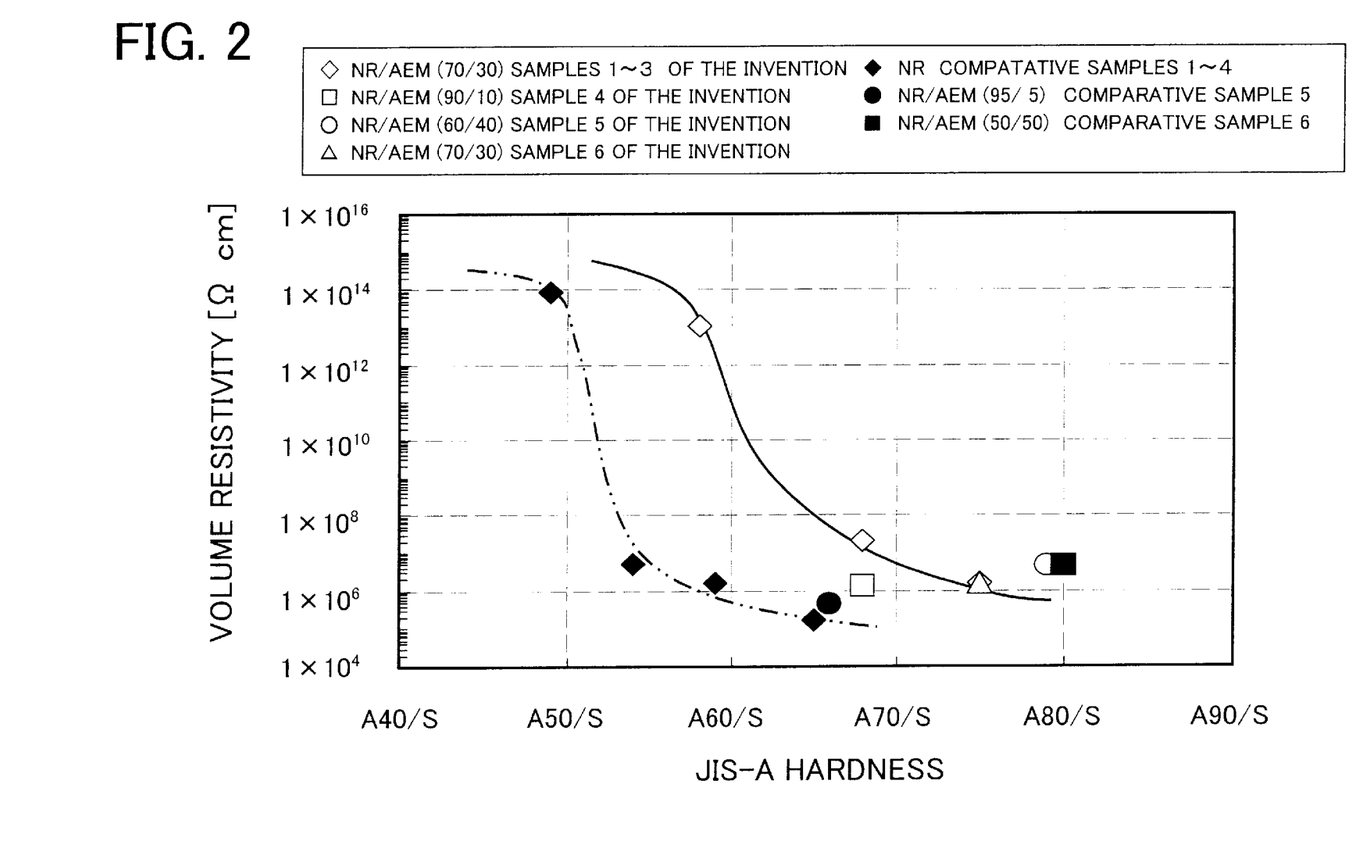
FIG. 2 is a graph showing a relationship between the volume resistivity and the hardness in each test piece of the vulcanized rubber, which relationship was obtained in Examples of the invention.

The relationship between the volume resistivity and the hardness in each test piece is shown in graph of FIG. 2.

TABLE 4

| | Samples of the Invention | | | | | |
|---|---|---|---|---|---|---|
| | 1 | 2 | 3 | 4 | 5 | 6 |
| Tnsile strength Tb [Mpa] | 19.8 | 18.8 | 17.9 | 21.5 | 16 | 20 |
| Breaking elongation Eb [%] | 560 | 400 | 320 | 420 | 300 | 390 |
| JIS-A Hardness | A58/S | A68/S | A75/S | A68/S | A79/S | A75/S |
| Volume resistivity $\rho v$ [$\Omega$cm] | $1.13 \times 10^{13}$ | $2.12 \times 10^{7}$ | $1.61 \times 10^{6}$ | $1.35 \times 10^{6}$ | $4.57 \times 10^{6}$ | $1.65 \times 10^{6}$ |

TABLE 5

| | Comparative Samples | | | | | |
|---|---|---|---|---|---|---|
| | 1 | 2 | 3 | 4 | 5 | 6 |
| Tnsile strength Tb [Mpa] | 23.6 | 24 | 23.4 | 22 | 22 | 12.3 |
| Breaking elongation Eb [%] | 620 | 570 | 500 | 440 | 420 | 210 |
| JIS-A Hardness | A49/S | A54/S | A59/S | A65/S | A66/S | A82/S |
| Volume resistivity $\rho v$ [$\Omega$cm] | $8.47 \times 10^{13}$ | $5.26 \times 10^{6}$ | $1.59 \times 10^{6}$ | $1.65 \times 10^{5}$ | $4.52 \times 10^{5}$ | $4.65 \times 10^{6}$ |

It will be understood from TABLES 2–5 and the graph of FIG. 2 showing the relationship between the volume resistivity and the hardness of each test piece that the test pieces according to Samples 1–6 of the present invention have hardness values which are higher than those of the test pieces according to Comparative Samples 1–4 formed of the compositions including the substantially same amount of the carbon black as the compositions for the test pieces according to Samples 1–6 of the present invention. It is also recognized that the test pieces according to Samples 1–6 of the present invention have higher volume resistivity values than the test pieces according to Comparative Samples 1–4 having the substantially same degree of hardness as the test pieces according to Samples 1–6. Accordingly, the electrical conductivity is lowered in the test pieces according to Samples 1–6 of the present invention.

In each of the test pieces according to Comparative Samples 5 and 6 wherein the amounts of the acrylic rubber included in the respective rubber compositions do not fall within the specified range according to the present invention, the volume resistivity is not increased as desired, and the physical properties such as the tensile strength and the breaking elongation are deteriorated.

As is clear from the foregoing description, in the rubber product with the metallic structure according to the present invention, the vulcanized rubber, which has the island-sea structure wherein a suitable amount of the acrylic rubber is evenly dispersed in the form of fine particles in the matrix phase of the natural rubber, is bonded to the metallic structure. Owing to the dispersed fine particles of the acrylic rubber, the vulcanized rubber exhibits desired physical properties such as high hardness and strength, and is formed from the unvulcanized rubber composition in which the amount of carbon black is minimized, so that the volume resistivity of the vulcanized rubber can be effectively increased. Accordingly, the rubber product with the metallic structure of the present invention exhibits a high corrosion resistance, and has an effectively reduced weight.

Where the rubber product with the metallic structure constructed as described above is used on the automotive vehicles as a vibration damping rubber member, the automotive vehicles have an advantageously reduced weight and improved fuel economy, and attains high performance.

The method of the present invention permits the produced rubber product with the metallic structure to exhibit a high corrosion resistance.

What is claimed is:

1. A rubber product with a metallic structure formed an aluminum material, having a vulcanized rubber bonded, wherein an improvement comprises:

said vulcanized rubber being formed from a composition in which a natural rubber and an acrylic rubber are mixed in a proportion of 90/10–60/40 by weight; and said vulcanized rubber having an island-sea structure in which fine particles of said acrylic rubber having a size of 0.1–100 $\mu$m are dispersed in a matrix phase of said natural rubber.

2. A rubber product according to claim 1, wherein said vulcanized rubber has a volume resistivity of not lower than $1 \times 10^{6}$ $\Omega$cm.

3. A rubber product according to claim 1, wherein said vulcanized rubber has a volume resistivity of not lower than $1 \times 10^{8}$ $\Omega$cm.

4. A rubber product according to claim 1, wherein said fine particles of said acrylic rubber have a size of not larger than 10 $\mu$m.

5. A vibration damping rubber member for use on an automotive vehicle, the vibration damping member being constituted by the rubber product defined in claim 1.

* * * * *

UNITED STATES PATENT AND TRADEMARK OFFICE
CERTIFICATE OF CORRECTION

PATENT NO. : 6,656,582 B2
DATED : December 2, 2003
INVENTOR(S) : Takehiko Taguchi, Ako Yoshikawa and Shinji Iio It is certified that error appears in the above-identified patent and that said Letters Patent is hereby corrected as shown below:

<u>Column 14,</u>
Line 28, please change "formed an" to -- formed from an --
Line 29, please add "thereto" after -- bonded --

Signed and Sealed this

Tenth Day of February, 2004

JON W. DUDAS
*Acting Director of the United States Patent and Trademark Office*